United States Patent
Lee

(10) Patent No.: US 6,414,920 B1
(45) Date of Patent: Jul. 2, 2002

(54) METHOD FOR DETECTING SYNCHRONOUS INFORMATION ADAPTED TO DECODE INFORMATION RECORDED ON BURST CUTTING AREA OF OPTICAL DISC

(75) Inventor: Jeong-Seok Lee, Suwon-shi (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 0 days.

(21) Appl. No.: 09/471,111

(22) Filed: Dec. 23, 1999

(30) Foreign Application Priority Data

Dec. 24, 1998 (KR) .............................. 98-58366

(51) Int. Cl.[7] ................................................ G11B 5/09
(52) U.S. Cl. ........................ 369/47.31; 369/53.31; 369/59.23
(58) Field of Search ..................... 369/47.19, 47.21, 369/47.22, 47.23, 47.31, 53.22, 53.31, 59.17, 59.18, 59.19, 59.23, 47.28; 360/48, 51

(56) References Cited

U.S. PATENT DOCUMENTS

| | | | | |
|---|---|---|---|---|
| 4,672,613 A | * | 6/1987 | Foxworthy et al. | ........... 710/22 |
| 5,333,126 A | * | 7/1994 | Fukuda et al. | ........... 369/59.24 |
| 5,502,699 A | * | 3/1996 | Yamasaki et al. | ........ 369/47.19 |
| 5,557,594 A | * | 9/1996 | Chiba et al. | ............. 369/59.24 |
| 5,604,727 A | * | 2/1997 | Ishihara | .................... 369/47.28 |
| 5,696,745 A | * | 12/1997 | Yamawaki | .................... 360/51 |

FOREIGN PATENT DOCUMENTS

| | | | |
|---|---|---|---|
| JP | 405089607 A | * | 4/1993 |
| JP | 5-242611 | | 9/1993 |

* cited by examiner

Primary Examiner—Thang V. Tran
(74) Attorney, Agent, or Firm—Sughrue Mion, PLLC

(57) ABSTRACT

Disclosed is a method for detecting synchronous information adapted to decode information recorded on a burst cutting area (BCA) on the surface of a recording medium, which method is capable of decoding the recorded information, based on only the detection of resync bytes recorded on the BCA and adapted to provide a synchronization for information recorded on the BCA following them, even when no sync byte recorded on the BCA to indicate the start point of the burst cutting area is detected. The method involves a resync byte detecting step for sequentially detecting the resync bytes following the sync byte when the sync byte is not detected, a detected information checking step for checking whether or not the resync bytes are sequentially detected in accordance with a predetermined order, and an information decoding step for reproducing and storing the information following the resync bytes when it is determined that the resync bytes are sequentially detected in accordance with the predetermined order, and decoding the stored information.

4 Claims, 3 Drawing Sheets

Fig. 2A

| | BCA PREAMBLE (4BYTE 0x00) | | | | BCA POSTAMBLE (4BYTE 0x00) |
|---|---|---|---|---|---|
| SCBCA | | | | | |
| RSBCA1 | $I_0$ | $I_1$ | $I_2$ | $I_3$ | |
| RSBCA1 | $I_4$ | $I_5$ | $I_6$ | $I_7$ | |
| RSBCA1 | ⋯ | ⋯ | ⋯ | ⋯ | |
| RSBCA1 | ⋯ | ⋯ | ⋯ | ⋯ | |
| RSBCA2 | ⋯ | INFORMATION | ⋯ | ⋯ | |
| ⋯ | ⋯ | ⋯ | ⋯ | ⋯ | |
| RSBCAn-1 | ⋯ | ⋯ | ⋯ | ⋯ | |
| RSBCAn | ⋯ | ⋯ | ⋯ | ⋯ | |
| RSBCAn | $I_{16n-12}$ | $I_{16n-11}$ | $I_{16n-10}$ | $I_{16n-9}$ | |
| RSBCAn | $I_{16n-8}$ | $I_{16n-7}$ | $I_{16n-6}$ | $I_{16n-5}$ | |
| RSBCAn | | 4 BYTE EDC DATA | | | |
| RSBCA13 | $C_{0,0}$ | $C_{1,0}$ | $C_{2,0}$ | $C_{3,0}$ | |
| RSBCA13 | $C_{0,1}$ | $C_{1,1}$ | $C_{2,1}$ | $C_{3,1}$ | |
| RSBCA13 | $C_{0,2}$ | $C_{1,2}$ | $C_{2,2}$ | $C_{3,2}$ | |
| RSBCA13 | $C_{0,3}$ | $C_{1,3}$ | $C_{2,3}$ | $C_{3,3}$ | |
| RSBCA14 | | | | | |
| RSBCA15 | | | | | |

Fig. 2B

| SYNC/RESYNC | FIXED SYNC PATTERN | | | | | | SYNC CODE | | | |
|---|---|---|---|---|---|---|---|---|---|---|
| | CHANNEL BIT | | | | | | DATA BIT | | | |
| | $c_{15}$ | $c_{14}$ | $c_{13}$ | $c_{12}$ | $c_{11}$ | $c_{10}$ | $c_9$ | $c_8$ | | $b_3$ $b_2$ $b_1$ $b_0$ |
| SCBCA | 0 | 1 | 0 | 0 | 0 | 1 | 1 | 0 | | 0 0 0 0 |
| RSBCA1 | 0 | 1 | 0 | 0 | 0 | 1 | 1 | 0 | | 0 0 0 1 |
| RSBCA2 | 0 | 1 | 0 | 0 | 0 | 1 | 1 | 0 | | 0 0 1 0 |
| ⋯ | ⋯ | ⋯ | ⋯ | ⋯ | ⋯ | ⋯ | ⋯ | ⋯ | | ⋯ |
| RSBCAi | 0 | 1 | 0 | 0 | 0 | 1 | 1 | 0 | | ⋯ |
| ⋯ | ⋯ | ⋯ | ⋯ | ⋯ | ⋯ | ⋯ | ⋯ | ⋯ | | ⋯ |
| RSBCA15 | 0 | 1 | 0 | 0 | 0 | 1 | 1 | 0 | | 1 1 1 1 |
| | RECORDED RZ MODE | | | | | | | | | RECORDED IN |

METHOD FOR DETECTING SYNCHRONOUS INFORMATION ADAPTED TO DECODE INFORMATION RECORDED ON BURST CUTTING AREA OF OPTICAL DISC

BACKGROUND OF THE INVENTION

1. Field of the Invention

The present invention relates to an optical disc drive system, and more particularly to a method for detecting synchronous information adapted to decode information recorded on a burst cutting area (BCA) on the surface of an optical disc.

2. Description of the Related Art

A BCA is an area arranged on the inner periphery of an optical disc, for example, a DVD (Digital Versatile Disc)-ROM disc. Such a BCA is formed on a disc using a laser cutting process in accordance with a manufacturer's option after the fabrication of the disc. Thus, the manufacturer can record, on the disc, desired information, for example, the serial number of the disc and anti-duplication information after the fabrication of the disc.

Typically, information including a sync byte and resync bytes are recorded on the BCA of a disc. The sync byte is adapted to indicate the start point of the BCA. Only one sync byte exists in the entire portion of the BCA. Each resync byte consists of a sync pattern and a sync code. When it is impossible to normally detect sync codes due to a defect involved in the sync byte, the start point of the BCA cannot be detected. In this case, the information recorded on the BCA cannot be decoded by an optical disk drive.

SUMMARY OF THE INVENTION

Therefore, an object of the invention is to provide a method for detecting synchronous information contained in resync bytes, where the synchronous information enables decoding of information recorded on a BCA on the surface of a recording medium, based solely on the detection of resync bytes recorded on the BCA, even when the sync byte is not detected.

In accordance with the present invention, this object is accomplished by providing a method for detecting sync information recorded on a burst cutting area of an optical disc, the burst cutting area being recorded with a sync byte that indicates the start point of the burst cutting area, and a plurality of resync bytes that provide synchronization for information recorded on the burst cutting area following the resync bytes, respectively, where each of the resync bytes consists of a sync pattern and a sync code. The information following the resync bytes is decoded based on the result of the detection of the sync information contained in the resync bytes, the method comprising: a resync byte detecting step for sequentially detecting the resync bytes following the sync byte when the sync byte is not detected; a detected information checking step for checking whether or not the resync bytes are sequentially detected in accordance with a predetermined order; and an information decoding step for reproducing and storing the information following the resync bytes when it is determined that the resync bytes are sequentially detected in accordance with the predetermined order, and decoding the stored information.

BRIEF DESCRIPTION OF THE DRAWINGS

The foregoing and other objects, features and advantages of the present invention will become more apparent from the following detailed description when taken in conjunction with the accompanying drawings in which:

FIGS. 2A–2B illustrate the recorded information state of a BCA on the inner periphery of a DVD-ROM disc.

DETAILED DESCRIPTION OF THE PREFERRED EMBODIMENT

Reference will now be made in greater detail to the preferred embodiments of the present invention.

Figure 1:
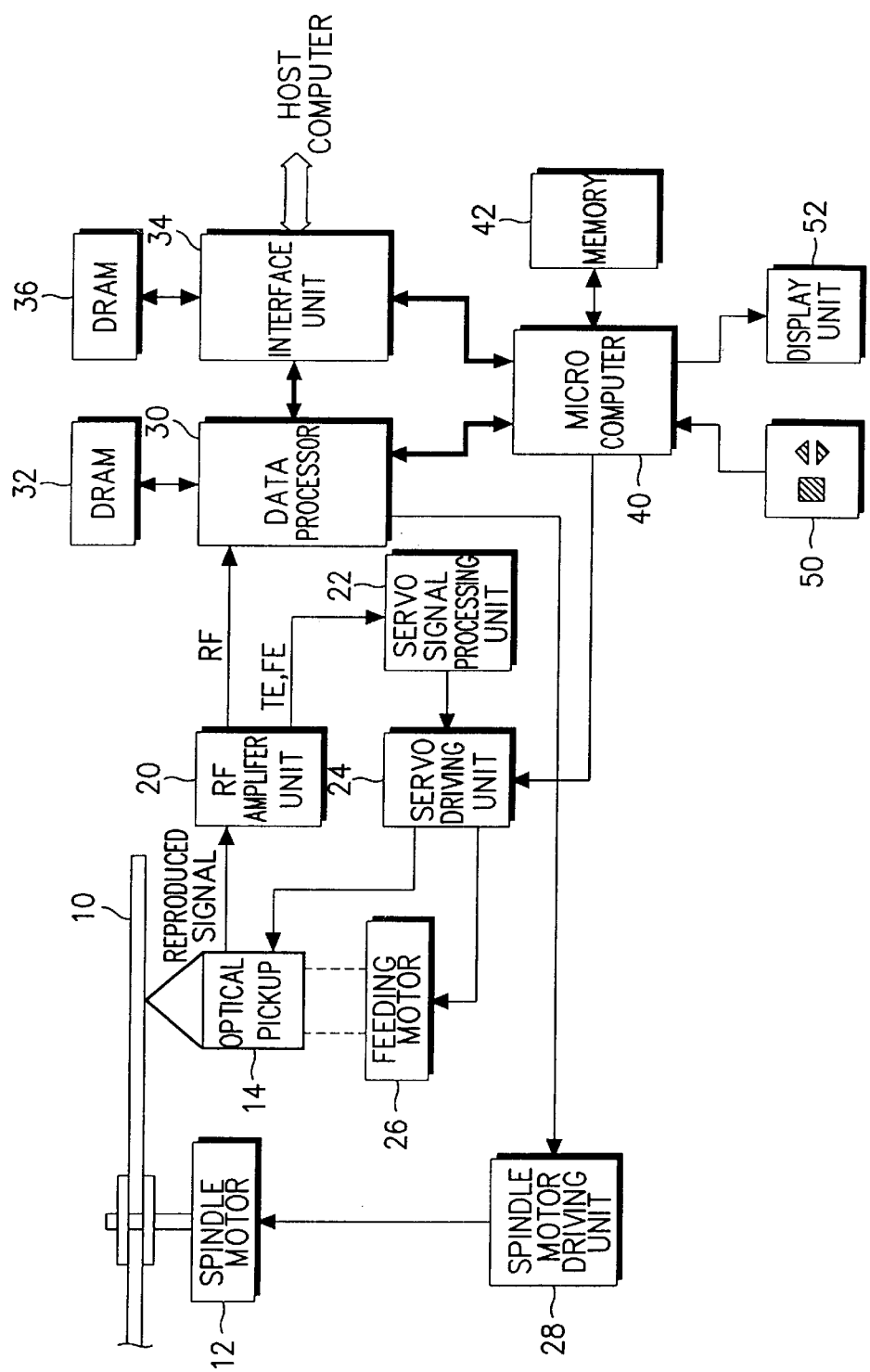
FIG. 1 is a block diagram illustrating a DVD-ROM drive to which the present invention is applied.

FIG. 1 is a block diagram illustrating a DVD-ROM drive to which the present invention is applied. Referring to FIG. 1, information recorded on the surface of an optical disc 10 is reproduced by an optical pickup 14. The optical pickup 14 optically picks up the information recorded on a data recording surface of the optical disc 10 rotating in accordance with a drive force from the spindle motor 12 and then converts the picked-up information into an electrical signal, namely, an RF signal. The RF signal from the optical pickup 14 is applied to an RF amplifier unit 20. The optical pickup 14 moves radially between the inner and outer peripheries of the surface of the optical disc 10 in accordance with a drive force from a feeding motor 26. The RF amplifier unit 20 amplifies the RF signal from the optical pickup 14, and removes noise and distortion from the amplified signal through a waveform equalization circuit, thereby outputting a shaped RF signal. The shaped RF signal from the RF amplifier unit 20 is applied to a data processor 30. The RF amplifier unit 20 also sends signals for focus and tracking servos, that is, a focus error signal FE and a tracking error signal TE, to a servo signal processing unit 22. The servo signal processing unit 22 applies control signals to a servo drive unit 24 for controlling a focus servo and a tracking servo, based on the focus error signal FE and tracking error signal TE, respectively. The servo drive unit 24 generates the drive voltages required to move the optical pickup 14, as well as to drive the tracking and focus servos, and applies the respective drive voltages to the optical pickup 14 and feeding motor 26, where the servos are located.

The data processor 30 decodes the RF signal received from the RF amplifier unit 20 and conducts an error correction for the resultant decoded data. The resultant signal from the data processor 30 is then applied to an interface unit 34. The data processor 30 also outputs a drive control signal to a spindle motor drive unit 28. Based on the drive control signal from the data processor 30, the spindle motor drive unit 28 drives the spindle motor 12. That is, the data processor 30 preferably includes a PLL circuit, an error correction circuit (ECC), a synchronization detecting unit, and data decoder in order to conduct its intrinsic operations as mentioned above.

The interface unit 34 interfaces a variety of control signals between the DVD-ROM drive and a host computer such as a personal computer. The interface unit 34 also outputs data received from the data processor 30 to the host computer. DRAMs 32 and 36 are used as an error correction memory for the data processor 30 and a transfer data buffer memory for the interface unit 34, respectively.

A microcomputer 40 is coupled to both the data processor 30 and interface unit 34. The microcomputer 40 is coupled to a memory 42, which has a ROM stored with control programs adapted to execute a variety of operations, and a RAM for temporarily storing a variety of data generated during those operations, in order to control the entire operation of the drive. Coupled to the microcomputer 40 are a display unit 52 for displaying the operation state of the drive and a key button unit 50 for inputting operation commands.

Figure 3:
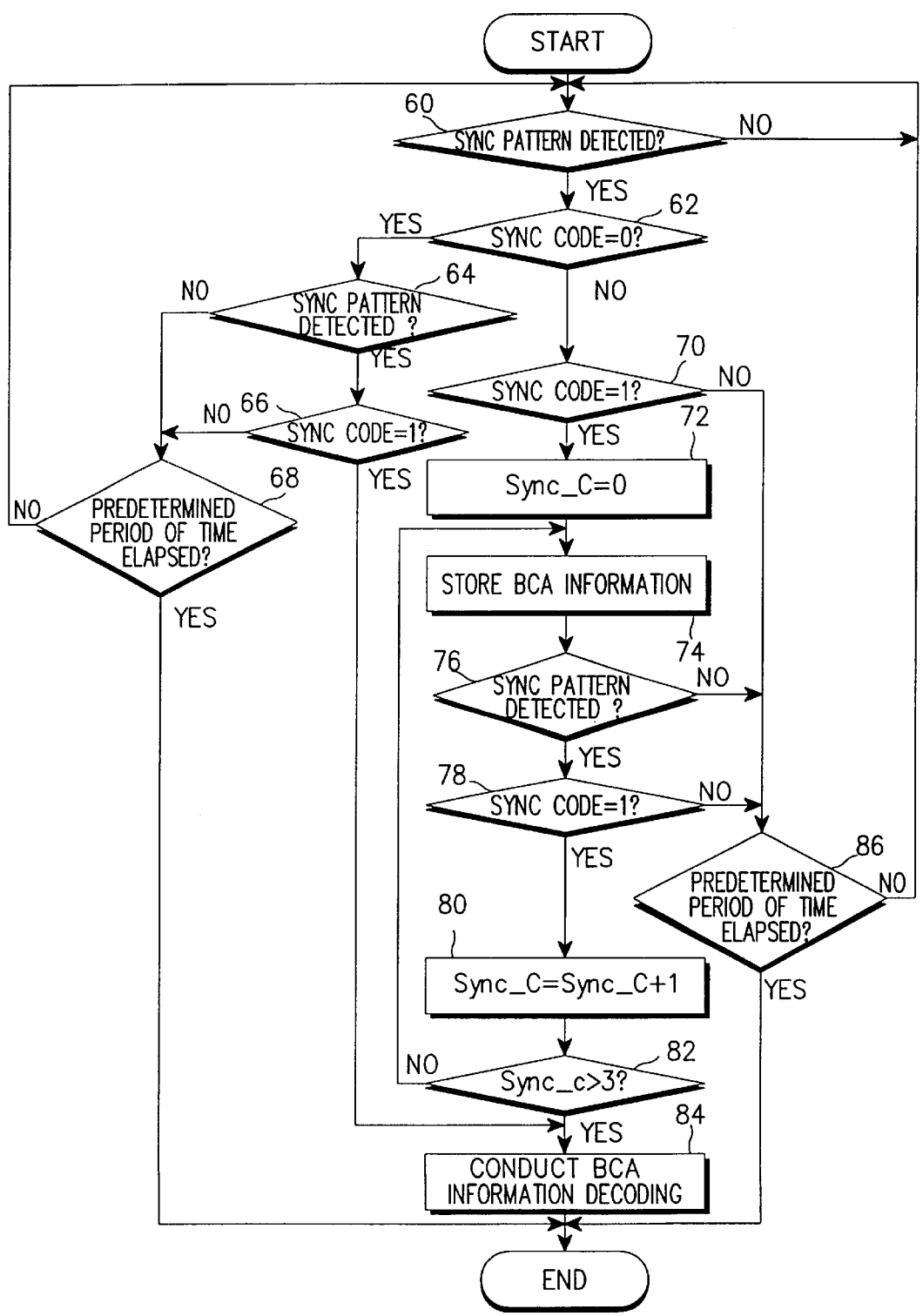
FIG. 3 is a flow chart illustrating a method for detecting sync information in accordance with an embodiment of the present invention.

FIGS. 2A and 2B illustrate tables of the recorded information state of the BCA on the inner periphery of the DVD-ROM disc 10. FIG. 3 is a flow chart illustrating a method for detecting sync information in accordance with an embodiment of the present invention.

Recorded on the BCA are a sync byte, resync bytes, and a variety of information. In FIGS. 2A and 2B, the sync byte is denoted by SCBCA whereas each resync byte is denoted by RSBCA. FIG. 2A illustrates the configuration of the BCA. As shown, each piece of information recorded on the BCA is denoted by I, and C denotes an ECC parity. In FIG. 2B, data structures of the sync byte and resync bytes, each of which consists of a fixed sync pattern and a sync code, are illustrated. In FIG. 2A, the BCA has blocks each consisting of 16 information bytes designated as I. The BCA may have a maximum of 13 blocks. Each block of the BCA includes sub-blocks each containing 4 bytes of information. Every sub-block follows a resync byte. Accordingly, one information block consists of 4 resync bytes and 16 information bytes.

The sync byte is the first sync information indicative of the start position of the BCA. Accordingly, only one sync byte exists in the BCA. On the other hand, the resync byte is the second sync information adapted to provide a synchronization for 4 information bytes, for example, $I_0$, $I_1$, $I_2$, and $I_3$. As shown in FIG. 2B, such a resync byte consists of a fixed sync pattern having a size of 8 channel bits and a sync code having a size of 4 data bits. The fixed sync pattern is a particular pattern which is configured not to be detected from the general information area, but to be detected only from the sync and resync area. The sync code of each resync byte is a serial number allocated to an associated information block and adapted to distinguish the information block from other information blocks.

Now, the sync information detecting method, which is carried out in the data processor 30 of FIG. 1, will be described in detail in conjunction with FIG. 3.

In response to a start command from the microcomputer 40 for an operation of decoding information recorded on the BCA, the data processor 30 generates a clock in sync with a reproduced signal in order to detect information from the reproduced signal. Based on the generated clock, the data processor 30 detects the start position of the BCA in accordance with the following sync information detecting method. First, the data processor 30 monitors the reproduced signal at step 60 in order to check whether or not a fixed sync pattern is detected. When it is determined at step 60 that a fixed sync pattern is detected, the control procedure carried out by the data processor 30 proceeds to step 62. At step 62, it is determined whether or not a sync code detected following the detected sync pattern has a value of 0. Where the detected sync code has a value of 0, the detected sync pattern is that of the first sync information, namely, the sync byte. On the other hand, where the detected sync code has not a value of 0, the detected sync pattern is that of the second sync information, namely, the resync byte. Accordingly, when it is determined at step 62 that the detected sync code has a value of 0, the data processor 30 sequentially executes steps 64 and 66 in order to perform again a detection for a fixed sync pattern and a sync code following the fixed sync pattern. Where a fixed sync pattern is detected at step 64, and the sync code detected following the detected sync pattern at step 66 has a value of 1, the control procedure proceeds to step 84 in order to execute a general BCA information decoding operation because the detected sync pattern is that of a second sync information just following the first sync information. Here, the general BCA information means information I following the detected second sync information. Also, the general BCA information decoding operation means an operation for detecting and decoding successive second sync information and BCA information following the sync code having a value of 1.

Where no sync pattern is detected at step 64 or where the value of the detected sync code is not 1, the control procedure proceeds to step 68. At step 68, it is checked whether or not a predetermined period of time has elapsed. Where a predetermined period of time has elapsed, the control procedure is ended. If not, the control procedure returns to step 60. The reason why the control procedure is completed when a predetermined period of time has elapsed is to switch the operation mode of the data processor 30 to a standby mode unless a sync information is detected within the predetermined period of time. This is because the sync information detecting method according to the illustrated embodiment of the present invention is adapted to be executed in the procedure for initializing the drive.

Now, a procedure carried out when no first sync information is detected will be described. Even when no first sync information is detected, second sync information may be detected. Where it is determined at step 60 that a fixed sync pattern is detected, and at step 70 that the sync code detected following the detected sync pattern has a value of 1, the control procedure carried out by the data processor 30 proceeds to step 72. At step 72, Sync_C is set to 0. The Sync_C represents the number of detected sync codes. The reason why the number of detected sync codes is to be counted is to check whether not all second sync information of each information block consisting of 4 items of second sync information, namely, 4 resync bytes, are completely detected. An incomplete detection of the successive second sync information of the information block may result in a loss of information. When the information detection for an information block is achieved from the second, third, or fourth resync byte of the information block, 4, 8 or 12 bytes may be lost, respectively.

After setting the number of detected sync codes, Sync_C, to 0, as mentioned above, the control procedure of the data processor 30 proceeds to step 74. At step 74, the data processor 30 decodes BCA information following the detected resync byte and stores the decoded information. Thereafter, the control procedure proceeds to step 76. At step 76, the data processor 30 checks whether or not another sync pattern is detected. Where it is determined at step 76 that another sync pattern is detected, it is then checked at step 78 whether or not the sync code detected following the detected sync pattern has a value of 1. When it is determined at step 78 that the detected sync code has a value of 1, at step 80, the number of detected sync codes is incremented by one. Thereafter, the control procedure proceeds to step 82. At step 82, it is checked whether or not the number of detected sync codes, Sync_C, is more than 3. Where the number of detected sync codes, Sync_C, is not more than 3, the data processor 30 repeatedly executes steps 74 to 82 until the number of detected sync codes, Sync_C is more than 3. Subsequently, the control procedure of the data processor 30 proceeds to step 84. At step 84, the general BCA information decoding operation for the block associated with the detected sync codes is executed. Thus, the decoding operation for one block containing 4 second sync information is completed.

Although not shown, the data processor 30 then repeatedly executes steps 60 to 84 until the decoding operation for BCA information of all blocks is completed.

Therefore, in accordance with the present invention, decoding of BCA information can be achieved, based only on the detection of the second sync information, even when no first sync information indicating the start position of the BCA is detected.

As apparent from the above description, the present invention provides an advantage in that information recorded on a BCA on the surface of a recording medium can be decoded, based on only the detection of resync bytes recorded on the BCA, even when a sync byte recorded on the BCA is not detected due to a defect involved in the sync byte.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A method for detecting sync information recorded on a burst cutting area of an optical disc, said burst cutting area having recorded thereon a sync byte that indicates a start point of said burst cutting area, and a plurality of resync bytes that provide synchronization for information recorded on said burst cutting area following the resync bytes, respectively, wherein each of said resync bytes consists of a sync pattern and a sync code, and wherein said information following said resync bytes is decoded based on the result of the detection of said sync information contained in said resync bytes, said method comprising:

(a) sequentially detecting said resync bytes following said sync byte when said sync byte is not detected;

(b) evaluating whether said resync bytes are sequentially detected in accordance with a predetermined order;

(c) returning to step (a) if it is determined that said resync bytes are not sequentially detected in accordance with the predetermined order;

(d) reproducing and storing said information following said resync bytes when it is determined that said resync bytes are sequentially detected in accordance with said predetermined order; and (e) decoding said stored information.

2. The method in accordance with claim 1, wherein evaluating said resync bytes comprises:

(a) identifying the sync pattern and the sync code associated with each of said sequentially detected resync bytes and determining whether each sync code has a code value that corresponds to said predetermined order;

(b) counting the number of sync codes identified in step (a) having a code value corresponding to said predetermined order; and (c) determining said resync bytes to be properly detected when said number of sync codes counted at said step (b) is more than a predetermined value.

3. A method for retrieving desired information of an information block recorded in a burst cutting area of an optical disc when a sync byte is cannot be read, said information block containing said sync byte that indicates a starting point of said burst cutting area, a plurality of coded information bytes that store said desired information, and a plurality of resync bytes that provide synchronization information corresponding to respective coded information bytes, said method comprising:

(a) sequentially detecting said resync bytes when said sync byte cannot be read;

(b) determining whether said resync bytes are properly sequentially detected according to a predetermined order;

(c) if said resync bytes are not properly sequentially detected, returning to step (a);

(d) if said resync bytes are properly sequentially detected, reproducing and storing coded information bytes corresponding to said synchronization information of said resync bytes; and (e) decoding the stored information bytes to produce said desired information.

4. The method according to claim 3, wherein the step of determining whether said resync bytes are properly sequentially detected according to the predetermined order comprises:

(a) identifying a sync code associated with each of said sequentially detected resync bytes;

(b) determining whether each identified sync code matches a code value of said predetermined order;

(c) counting the number of sync codes that satisfy step (b); and (d) determining the resync bytes to be properly sequentially detected when the number of sync codes counted in step (c) is greater than a predetermined value.

* * * * *